(12) United States Patent
Sabraoui et al.

(10) Patent No.: US 12,281,921 B2
(45) Date of Patent: Apr. 22, 2025

(54) ULTRASONIC FLUID METER INCORPORATING A PRESSURE SENSOR

(71) Applicant: SAGEMCOM ENERGY & TELECOM SAS, Rueil Malmaison (FR)

(72) Inventors: Abbas Sabraoui, Rueil Malmaison (FR); Ahmet Samed Basturk, Rueil Malmaison (FR); Oussama Abid, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 18/140,300

(22) Filed: Apr. 27, 2023

(65) Prior Publication Data

US 2023/0349737 A1 Nov. 2, 2023

(30) Foreign Application Priority Data

Apr. 29, 2022 (FR) ..................................... 2204101

(51) Int. Cl.
  *G01F 1/68* (2006.01)
  *G01F 1/34* (2006.01)
  *G01F 1/667* (2022.01)
  *G01F 15/00* (2006.01)

(52) U.S. Cl.
  CPC ............... *G01F 1/34* (2013.01); *G01F 1/667* (2013.01); *G01F 1/68* (2013.01); *G01F 15/005* (2013.01)

(58) Field of Classification Search
  CPC .............. G01F 1/34; G01F 1/667; G01F 1/68; G01F 15/005
  USPC ....................................................... 73/861.28
  See application file for complete search history.

(56) References Cited

U.S. PATENT DOCUMENTS

2020/0256713 A1   8/2020  Kabrich
2023/0349740 A1*  11/2023 Sabraoui ................... G01F 1/36

FOREIGN PATENT DOCUMENTS

DE  102019105948 A1  9/2020
EP      3643955 A1   4/2020

* cited by examiner

*Primary Examiner* — Alexander A Mercado
*Assistant Examiner* — Rodney T Frank
(74) *Attorney, Agent, or Firm* — MUNCY, GEISSLER, OLDS & LOWE, P.C.

(57) ABSTRACT

An ultrasonic fluid meter includes an ultrasonic measuring device, a valve comprising a movable member, a position sensor configured to measure the current position of the movable member, a pressure sensor arranged to measure the pressure of the fluid in the conduit; and a processing circuit arranged, if the current position of the movable member is such that the current flow rate cannot be measured by the ultrasonic measurement device, to evaluate the current flow rate as a function of the current position of the movable member, of the pressure of the fluid to the current flow rate, and of the pressure of the fluid at zero flow rate.

13 Claims, 11 Drawing Sheets

| P=1 bar | $D_1$ [L/h] | $D_2$ [L/h] | $D_3$ [L/h] | $D_4$ [L/h] |
| P=6 bar | $D_1$ [L/h] | $D_2$ [L/h] | $D_3$ [L/h] | $D_4$ [L/h] |

| P=16 bar | $D_1$ [L/h] | $D_2$ [L/h] | $D_3$ [L/h] | $D_4$ [L/h] |
|---|---|---|---|---|
| $\vartheta_1$ [rad] | $\Delta P_{11}$ | ⋮ | ⋮ | ⋮ |
| $\vartheta_2$ [rad] | $\Delta P_{21}$ | $\Delta P_{22}$ | ⋮ | ⋮ |
| $\vartheta_3$ [rad] | $\Delta P_{31}$ | $\Delta P_{32}$ | $\Delta P_{33}$ | ⋮ |

ULTRASONIC FLUID METER INCORPORATING A PRESSURE SENSOR

The invention relates to the field of ultrasonic fluid meters.

BACKGROUND OF THE INVENTION

An ultrasonic fluid meter will most usually comprise a conduit in which the fluid flows, and an ultrasonic measuring device comprising an upstream transducer (on the network side) and a downstream transducer (on the subscriber's installation side). Each transducer acts in succession as an emitter and as a receiver of ultrasonic signals. The upstream transducer therefore emits an ultrasonic signal into the conduit, which is received by the downstream transducer after having travelled in the fluid along a predefined path (of precisely known length). Next, the downstream transducer in turn emits an ultrasonic signal which is received by the upstream transducer after having travelled in the fluid along the predefined path (in the other direction). The ultrasonic measuring device then evaluates the flow rate of the fluid on the basis of the times of flight of the ultrasonic signals between the transducers. Estimating the fluid flow rate makes it possible to evaluate and invoice the quantity of fluid consumed.

In some countries, meters must be capable of limiting, regulating and shutting off the flow rate of fluid. As an example, in some countries and in the case of an unpaid water bill, the water distributor must provide the "bad payer" end-customer with a minimum flow rate for a certain number of days before completely shutting off access to the water.

This minimum flow rate may vary as a function of the country and the customer, and it is therefore necessary to have the possibility of regulating the flow rate "on demand": the flow rate has to be adjusted as a function of a flow rate setpoint.

In order to regulate the flow rate, proposals have been made to integrate a motorized ball valve into the meter conduit. The angular position of the ball can be controlled remotely in order to regulate the flow rate.

However, the dimensions of the meter must be limited, and it may be necessary to position the valve in the flow rate measurement zone, i.e. between the two transducers.

However, when the valve is not open sufficiently, the ultrasonic signals cannot travel in the conduit in the normal manner and follow the predefined path.

It is therefore impossible to measure and regulate the flow rate for certain angular positions of the ball.

OBJECT OF THE INVENTION

The aim of the invention is to be able to measure and regulate the flow rate of fluid irrespective of the state of the valve (open, closed, partially open) in an ultrasonic fluid meter comprising a conduit in which the fluid flows and a valve positioned in the conduit.

SUMMARY OF THE INVENTION

In order to achieve this aim, an ultrasonic fluid meter is provided comprising:
a conduit in which a fluid can flow;
an ultrasonic measurement device comprising two transducers arranged to emit and receive ultrasonic signals in the conduit, the ultrasonic measurement device being arranged to evaluate a current flow rate of the fluid from the time of flight of the ultrasonic signals between the transducers;
a valve positioned along a length of the conduit between the two transducers, the valve comprising a movable member (14) which extends in the conduit and for which a current position can be regulated in order to control the current flow rate of the fluid;
a position sensor configured to measure the current position of the movable member;
a pressure sensor arranged to measure the pressure of the fluid in the conduit
a processing circuit arranged, if the current position of the movable member is such that the current flow rate cannot be measured by the ultrasonic measurement device, to evaluate the current flow rate as a function of the current position of the movable member, of the pressure of the fluid to the current flow rate, and of the pressure of the fluid at zero flow rate.

Thus, in the meter of the invention, when the moving member of the valve obstructs the conduit so that the ultrasonic device is not operational, the pressure measurements produced by the pressure sensor can be used to evaluate and regulate the current fluid flow rate.

In one embodiment, the pressure sensor is positioned upstream of the valve.

In one embodiment, in order to evaluate the pressure of the fluid at zero flow rate, the processing circuit is configured to:
fully open the valve;
use the ultrasonic measuring device to measure the current flow rate;
wait until the current flow rate becomes zero;
then acquire at least one pressure measurement produced by the pressure sensor.

In one embodiment, in order to evaluate the pressure of the fluid at zero flow rate, the processing circuit is configured to:
fully close the valve;
then acquire at least one pressure measurement produced by the pressure sensor.

In one embodiment, the processing circuit is arranged, if the current position of the moving member is such that the current flow rate can be measured by the ultrasonic measurement device, to consolidate the measurement of the current flow rate of the fluid, produced by the ultrasonic measurement device, using the pressure of the fluid.

In one embodiment, the fluid is a compressible fluid, the fluid meter further comprising a temperature sensor configured to measure a temperature of the fluid in the conduit, the processing circuit being configured such that, if the current position of the movable member is such that the current flow rate cannot be measured by the ultrasonic measuring device, it also uses the temperature of the fluid to evaluate the current flow rate.

In one embodiment, the valve is a ball valve.

A method for measuring a current flow rate of a fluid is also provided, carried out in the processing circuit of an ultrasonic fluid meter as described above, and, if the current position of the movable member is such that the current flow rate cannot be measured by the ultrasonic measuring device, comprising the step of evaluating the current flow rate as a function of the current position of the movable member, of the pressure of the fluid at the current flow rate, and of the pressure of the fluid at zero flow rate.

In one embodiment, if the current position of the movable member is such that the current flow rate can be measured by the ultrasonic measuring device, the measurement method as described above comprises the steps of
measuring the current position of the movable member;
fully open the valve;
using the ultrasonic measuring device to measure the current flow rate;
waiting until the current flow rate becomes zero;
then acquiring at least one pressure measurement produced by the pressure sensor, and thus evaluating the pressure of the fluid at zero flow rate;
returning the movable member to said current position;
then acquiring at least one pressure measurement produced by the pressure sensor, and thus evaluating the pressure of the fluid at the current flow rate;
estimating the current flow rate as a function of said current position of the moving member, of the pressure of the fluid at the current flow rate, and of the pressure of the fluid at zero flow rate.

In one embodiment, the measurement method as described above further comprises the steps of:
detecting a time interval which extends between a time t1 and a time t2 such that:
at time t1, a value of the pressure of the fluid changes from a value equal to a pressure of the network to another value;
at time t2, the value of the pressure of the fluid again becomes equal to the pressure of the network;
integrating the current flow rate over the time interval [t1; t2] in order to calculate the volume consumed.

In addition, a computer program is provided, comprising instructions which cause the processing circuit of the meter as described above to execute the steps of the detection method as described above.

There is also provided a computer-readable storage medium, storing the above-described computer program.

In addition, a method for regulating a current flow rate is proposed, which is carried out in the processing circuit of an ultrasonic fluid meter as described above and comprising the steps of:
acquiring a flow rate setpoint;
estimating the current flow rate using the measurement method as described above;
adapting the current position of the movable member as a function of a difference between the flow rate setpoint and the current flow rate.

A computer program is also provided which comprises instructions which cause the processing circuit of the meter as described above to execute the steps of the regulation method as described above.

There is also provided a computer-readable storage medium, storing the above-described computer program.

The invention will be best understood in the light of the following description of particular non-limiting embodiments of the invention.

BRIEF DESCRIPTION OF THE DRAWING

Reference will be made to the accompanying drawings, among which.

DETAILED DESCRIPTION OF TEE INVENTION

Figure 1:
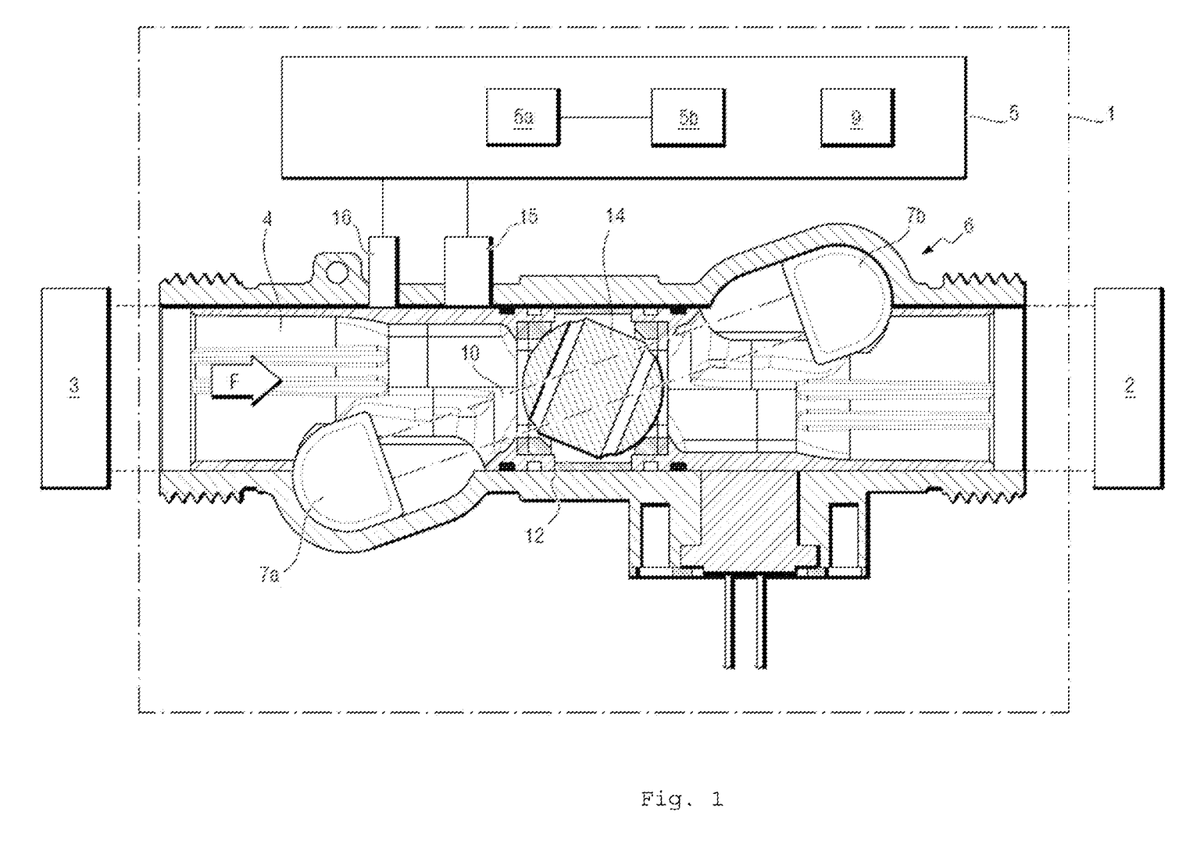
FIG. 1 shows an ultrasonic fluid meter in accordance with a first embodiment of the invention.
Figure 2:
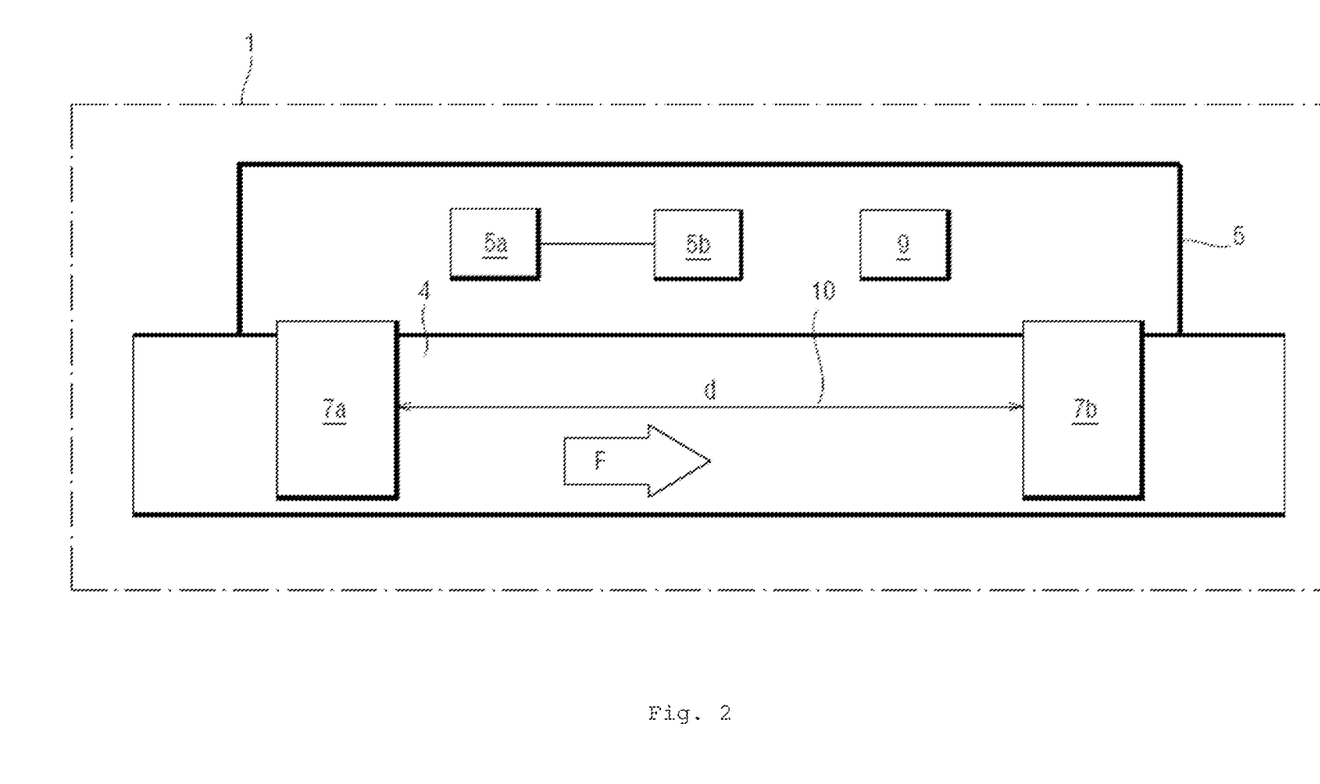
FIG. 2 diagrammatically shows two transducers in the conduit.

With reference to FIGS. 1 and 2, the invention is embodied in an ultrasonic water meter 1. Here, the meter 1 is a water meter which is used to measure the water consumption of an installation 2 of a subscriber. The water is supplied to the installation 2 of the subscriber by a water distribution network 3.

The meter 1 comprises a conduit 4 in which the water supplied by the network 3 to the installation 2 flows. The water flows in the conduit 4 from upstream to downstream, as indicated by the direction of the arrow F. Here, the term "upstream" means on the side of the network 3, and the term "downstream" means on the side of the installation 2.

The meter 1 comprises a processing circuit 5. The processing circuit 5 comprises at least one processing component 5a which, for example, is a "general-purpose" processor, a processor specialized in signal processing (or digital signal processor (DSP)), a microcontroller, or in fact a programmable logic circuit such as a FPGA (or field programmable gate array) or an ASIC (or application-specific integrated circuit). The processing circuit 5 also comprises one or more memories 5b which are connected to or integrated into the processing component 5a. At least one of these memories 5b forms a computer-readable storage support on which at least one computer program comprising instructions which cause the processing component 5a to execute at least some of the steps of the measurement method and the regulation method, which will be described below, are stored.

The meter 1 also comprises an ultrasonic measuring device 6. The ultrasonic measuring device 6 is used "by default" in order to measure the flow rate of water supplied to the installation 2 by the network 3.

The ultrasonic measuring device 6 includes an upstream transducer 7a and a downstream transducer 7b. The ultrasonic measuring device 6 also includes a measurement module 9 connected to the upstream transducer 7a and to the downstream transducer 7b. Here, the processing module 9 is implemented in the processing circuit 5.

The upstream transducer 7a and the downstream transducer 7b are (but not necessarily) paired. In this example, the upstream transducer 7a and the downstream transducer 7b are piezoelectric transducers.

Each transducer 7a, 7b acts in succession as an emitter and a receiver of ultrasonic signals.

The processor module 9 generates an electrical excitation signal and delivers the electrical excitation signal to the emitter. The emitter then generates an ultrasonic signal. The receiver receives the ultrasonic signal after it has travelled in the fluid along a predefined path 10, and the processing module 9 measures the time of flight.

The predefined path 10 here is a straight path (inclined with respect to a longitudinal axis of the conduit 4, as is the case in FIG. 1, or parallel to said axis, as is the case in FIG. 2). The predefined path 10 has a length d, which is very precisely known.

Thus, firstly, the upstream transducer 7a emits the ultrasonic signal which is received by the downstream transducer 7b. The processing module 9 measures the time of flight from upstream to downstream, $TOF_{UP}$.

Next, the downstream transducer 7b emits the ultrasonic measurement signal which is received by the upstream transducer 7a. The processing module 9 measures the time of flight from downstream to upstream, $TOF_{DN}$.

We have:

$$TOF_{UP} = \frac{d}{c - v_{fluid}}$$

$$TOF_{DN} = \frac{d}{c + v_{fluid}}$$

where c is the speed of sound in water, d is the length of the predefined path 10, and $v_{fluid}$ is the speed of flow of the water.

We now define $\Delta_{TOF}$ and $\Sigma_{TOF}$:

$\Delta_{TOF} = TOF_{DN} - TOF_{UP}$ $\Sigma_{TOF} = TOF_{DN} + TOF_{UP}$

The processing module 9 calculates the speed of sound via the mean of the two times of flight (outward and return), which is independent of the flow of the fluid:

$$c = \frac{2d}{\Sigma_{TOF}}$$

The processing module 9 calculates the speed of flow of the water as follows:

$$v_{fluid} = \frac{1}{2} \cdot \left( \frac{d}{TOF_{UP}} - \frac{d}{TOF_{DN}} \right)$$

$$v_{fluid} = \frac{d}{2} \cdot \frac{TOF_{DN} - TOF_{UP}}{TOF_{UP} \cdot TOF_{DN}}$$

$$v_{fluid} \approx 2d \cdot \frac{\Delta_{TOF}}{\Sigma_{TOF}^2}$$

The temperature is calculated from the speed of sound, for example via a polynomial approximation, without taking into account the pressure if this is not measured:

$$T = \sum_{i=0}^{N} a_i \times c^i$$

From these data, the flow rate Q of the water is calculated as follows:

$$Q = K_T \cdot v = K_T \cdot \frac{\Delta_{TOF}}{(\Sigma_{TOF})^2} = K_T \cdot \frac{\Delta_{TOF}}{2d} \cdot c^2$$

The factor $K_T$ is homogeneous at a surface and, inter alia, is correlated with the section of the conduit 4. The factor $K_T$ is derived from a first reference table, as a function of the temperature of the water. The first reference table is stored in a memory 5b of the processing circuit 5. For a measured $\Delta_{TOF}$, the temperature is calculated via the speed of sound. Next, the $K_T$ is obtained via the first reference table as a function of the previously calculated temperature.

Figure 3:
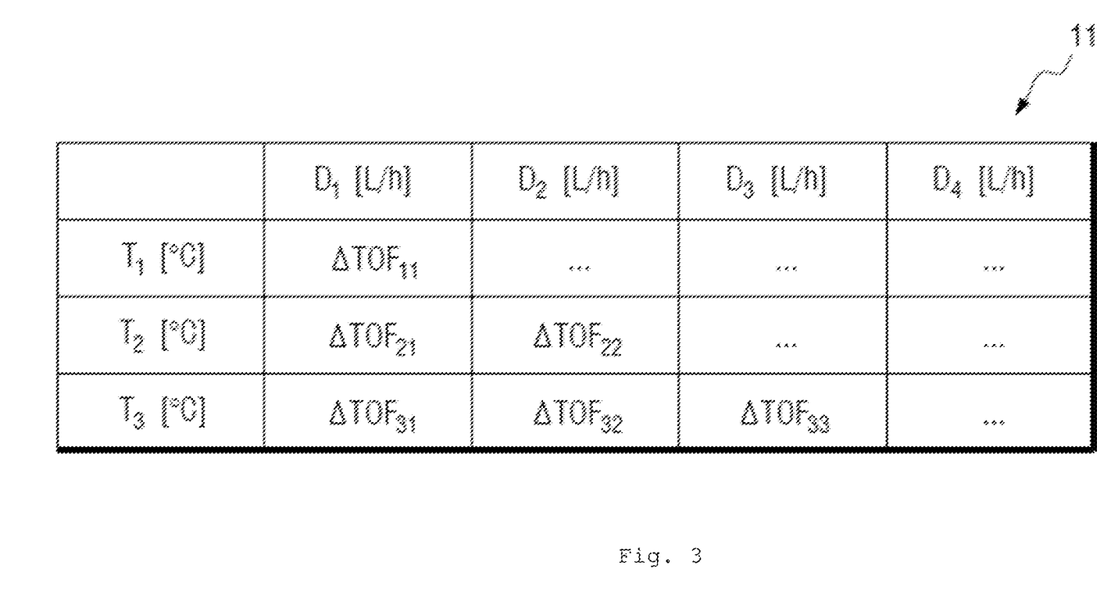
FIG. 3 shows a table for a second reference table.

With reference to FIG. 3, in order to limit the complex calculations (and therefore the calculation time and the energy consumption), it is possible to use a second reference table 11 in order to estimate the flow rate of the water. By way of example, this second reference table 11 is in two dimensions: temperature vs flow rate. The second reference table 11 is stored in a memory 5b of the processing circuit 5.

Here, the second reference table 11 comprises a single table.

As an example, if the temperature is equal to $T_1$, and if $\Delta_{TOF}$ is equal to $\Delta TOF_{11}$, the processing module 9 will deduce therefrom that the flow rate is equal to $D_1$.

The meter 1 also comprises a valve 12 which makes it possible to regulate, limit or shut off the flow of water. The valve 12 can be seen in FIG. 1, but is not shown in FIG. 2.

The valve 12 is positioned between the two transducers 7a, 7b along a length of the conduit 4.

The valve 12 is a motorized (electromechanical) multi-position valve. The valve 12 comprises a movable member which extends in the conduit 4 and for which a current position can be regulated in order to control the current flow rate of the fluid. Here, the valve 12 is a ball valve and the movable member is therefore a ball 14; the current position of the ball 14 is an angular position.

The counter 1 also comprises a position sensor 15 configured to measure the current position of the ball 14.

The meter 1 additionally comprises communication means which can be used to implement any type of communication, for example communications via a 2G, 3G, 4G, Cat-M or NB-IOT cellular network, communications in accordance with the LoRa protocol, radio communications in accordance with the Wize standard operating at a frequency of 169 MHz, etc.

The communication means in particular enable the processing circuit 5 to receive a flow rate setpoint from outside. As an example, the flow rate setpoint is transmitted by an information system (IS) of the water supplier or the network manager, possibly via a data concentrator.

The processing circuit 5 acquires the flow rate setpoint, the current position of the ball 14 (measured by the position sensor 15), and can therefore regulate the current flow rate by modifying the angular position of the ball 14 if necessary. It should be noted that the processing circuit 5 is also capable of controlling the valve 12 autonomously (i.e. without receiving a setpoint from outside). It should also be noted that the valve 12 could be managed via a different setpoint, for example via an angular position setpoint for the ball 14.

The meter 1 also includes a pressure sensor 16 that is positioned in the conduit 4. The first pressure sensor 16 is here positioned in the conduit 4 upstream from the valve 12, approximately facing the upstream transducer 7a. The pressure sensor 16 makes it possible to measure the instantaneous pressure of the fluid in the conduit 4.

As was shown above, the ultrasonic measuring device 6 is used by default to measure the current flow rate.

However, when the valve 12 is not sufficiently open (i.e. for certain angular positions of the ball (14), there is a possibility that the ball 14 will prevent the ultrasonic signals from travelling between the transducers 7a, 7b: the valve 12 obstructs the ultrasound field and the water flow rate cannot then be measured by the ultrasound measuring device 6. Under such circumstances, the processing circuit 5 uses the pressure sensor 16 to measure the current flow rate of the water in the conduit 4.

Specifically, the valve 12 acts as a pressure-reducing device, amplifying the load drop between its inlet and its outlet.

When the valve 12 is open or partially open and the current flow rate is zero, the pressure measured is the pressure of the network at this point (static pressure).

For a given pressure of the network with the valve closed, opening the valve will cause the pressure to vary (drop): there will be a difference between the pressure at zero flow rate and the pressure with a flow rate.

The change in section (conduit, valve, etc.) generates variations in speed and therefore in pressure. The measured instantaneous pressure (for a constant network pressure) is therefore a reflection of the current flow rate.

When the valve 12 is closed, the current flow rate is zero, and the pressure measured is the pressure of the network at this point (static pressure).

When the current position of the ball 14 is such that the current flow rate cannot be measured by the ultrasonic measuring device 6, i.e. when the valve 12 is in a semi-open position and ultrasonic measurement is impossible, the processing circuit 5 evaluates the current flow rate as a function of the current angular position of the ball 14, of the pressure of the fluid at the current flow rate, and of the pressure of the fluid at zero flow rate.

Figure 4:
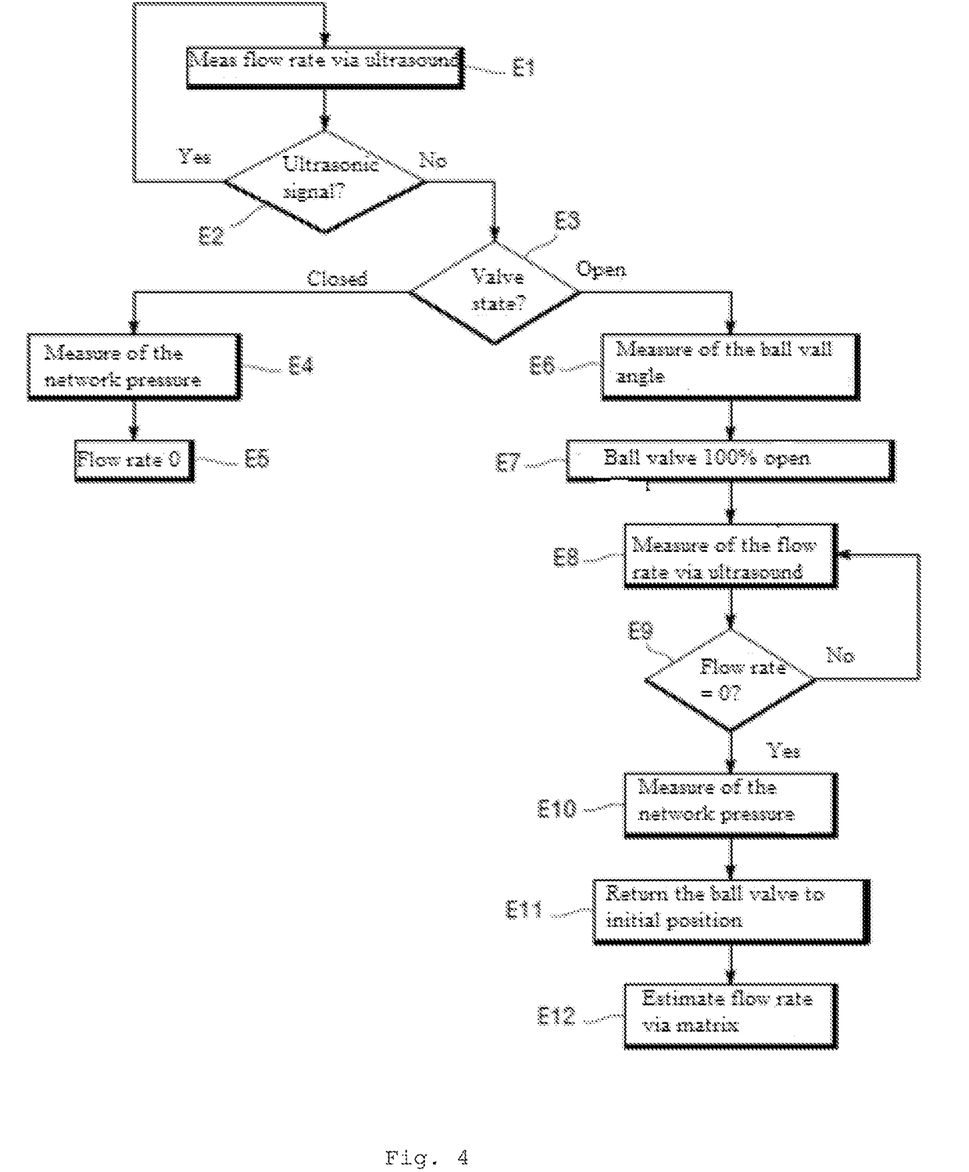
FIG. 4 shows the steps of a measurement method.

Referring now to FIG. 4, a more detailed description of the measurement method implemented by the processing circuit 5 in this case will now be made.

The processing circuit 5 first attempts to measure the current flow rate by using the ultrasonic measurement device 6 (step E1).

The processing circuit 5 verifies whether the ultrasonic signals can travel freely between the transducers 7a, 7b, and therefore whether the current position of the ball 14 is such that the current flow rate can be measured by the ultrasonic measuring device 6 (step E2). If this is the case, the processing circuit 5 uses the ultrasonic measurement device 6 to measure the current flow rate.

Otherwise, the processing circuit 5 acquires the current position of the ball 14 (via the position sensor 15): step E3.

If the valve 12 is closed, the processing circuit 5 acquires at least one pressure measurement produced via the pressure sensor 16 (step E4), and thus evaluates the water pressure at zero flow rate (step E5).

If the valve 12 is partially open, the processing circuit 5 measures the current position of the ball 14 (step E6).

The processing circuit 5 then fully opens the valve (to 100%): step E7.

The processing circuit therefore uses the ultrasonic measuring device 6 to measure the flow rate (step E8).

The processing circuit 5 waits until the current flow rate is zero (step E9).

When the current flow rate is zero, the processing circuit 5 acquires at least one pressure measurement produced by the pressure sensor 16, and thus evaluates the pressure of the water at zero flow rate (step E10).

The processing circuit 5 then returns the ball 14 to its initial position (i.e. to the current position): step E 11.

The processing circuit 5 then acquires at least one pressure measurement produced by the pressure sensor 16, and thus evaluates the pressure of the water at the current flow rate. The processing circuit 5 then estimates the current flow rate as a function of the current position of the ball 14, of the pressure of the water at the current flow rate and of the pressure of the water at zero flow rate (step E12).

Using the hypothesis that the static pressure PS of the network 3 does not vary or varies slightly compared with the measurement frequency of the network pressure 3, the difference $\Delta P$ between the pressure of the network PS and the instantaneous pressure ($\Delta P=PS-PI$) is in fact a reflection of the current flow rate.

Figure 5:
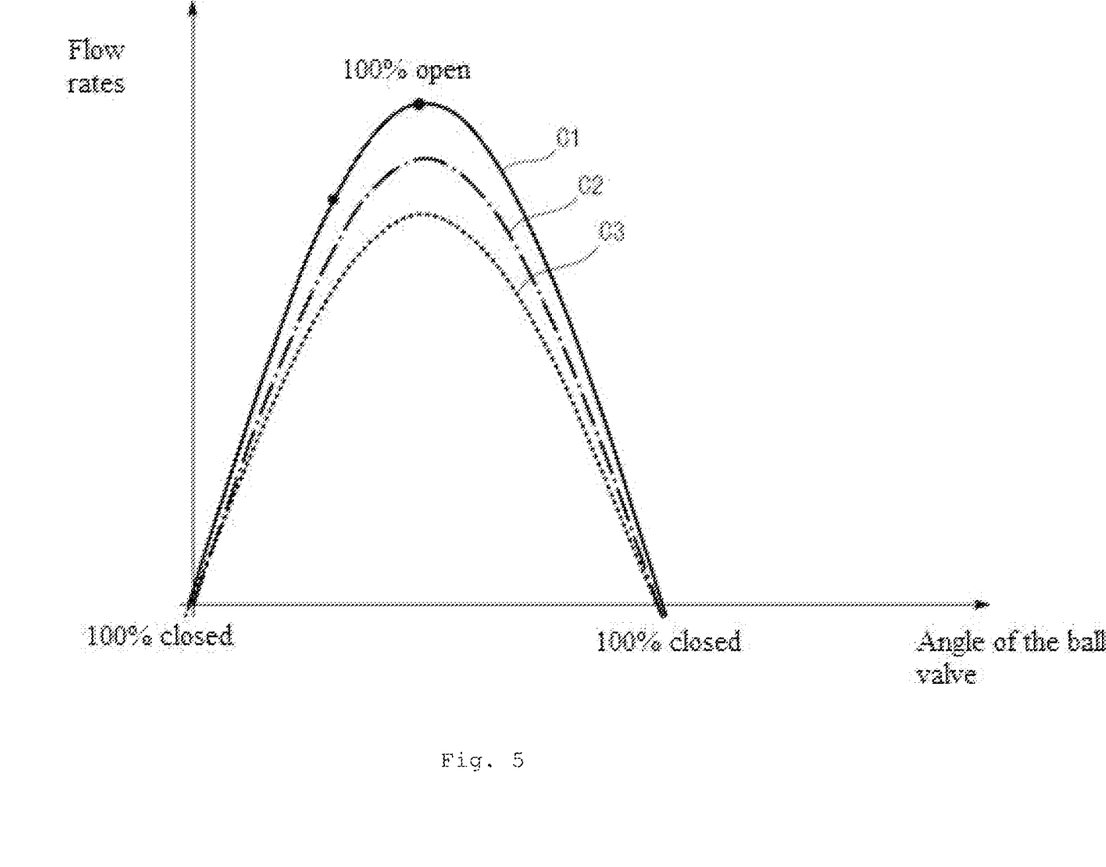
FIG. 5 shows a graph showing plots for the variation in the flow rate as a function of the valve opening angle, for different network pressure values.

FIG. 5 shows the way in which the flow rate varies as a function of the angular position of the ball 14 of the valve 12, for different values of the network pressure: the plot C1 corresponds to a network pressure of 16 bars, the plot C2 to a pressure of 6 bars, and the plot C3 to a pressure of 1 bar.

Figure 6:
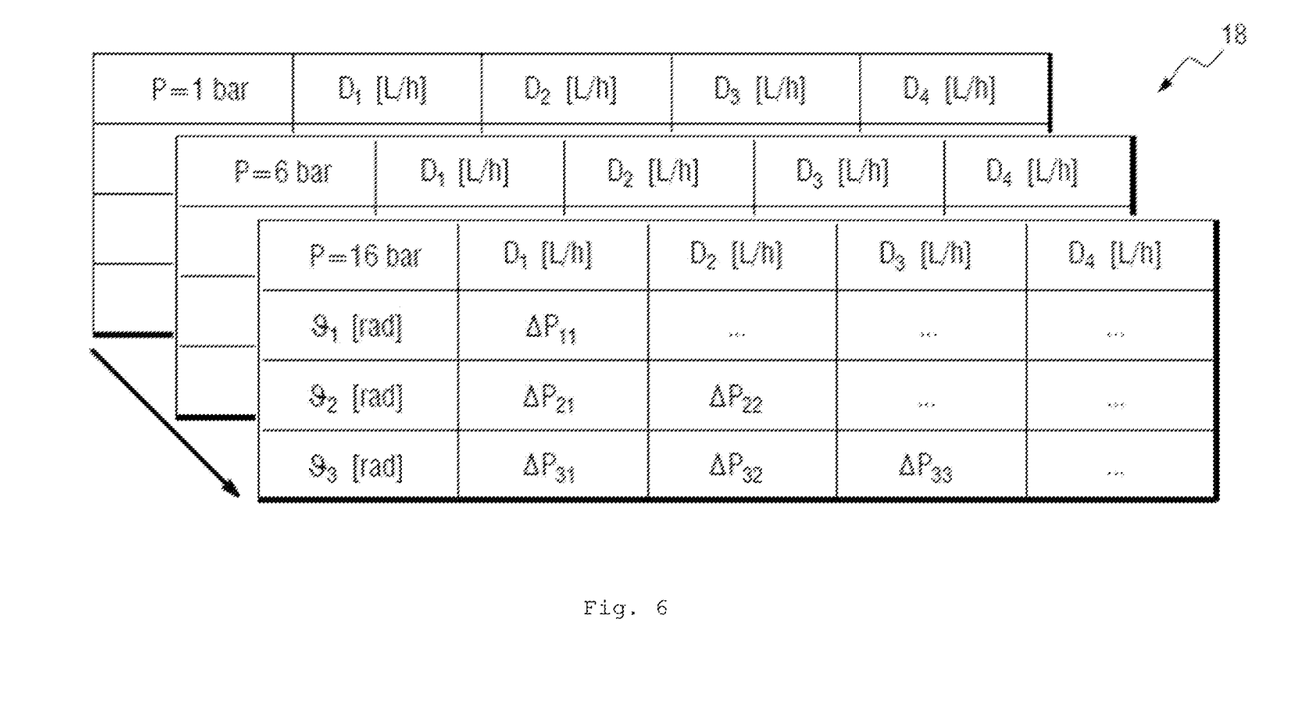
FIG. 6 shows tables for a third reference table.

With reference to FIG. 6, in order to estimate the current flow rate, the processing circuit 5 then uses a third reference table 18 which is stored in a memory 5b of the processing circuit 5.

The third reference table 18 is a three-dimensional table, which comprises, for example, three tables, each associated with a pressure of the network PS: PS=16 bar, PS=6 bar, PS=1 bar.

For example, if the network pressure is PS=16 bars, and $\Delta P=PS-PI=\Delta P_{31}$, and the angular position of the ball is $\theta=\theta_3$, the processing circuit 5 estimates that the current flow rate is equal to $D_1$.

It should be observed that the static pressure of the network PS is considered to be constant until the next measurement. A closure of the valve 12 can be programmed for the purpose of updating it if necessary.

With reference again to FIG. 4, it should be observed that the steps E7, E8, and E9 could be replaced by a step consisting merely in fully closing the valve 12 (which could be penalizing for the subscriber). The flow rate is then zero. The treatment circuit 5 then acquires at least one pressure measurement produced by the pressure sensor 16 in order to evaluate the pressure of the water at zero flow rate.

If necessary, the processing circuit 5 may also regulate the current flow rate.

Figure 7:
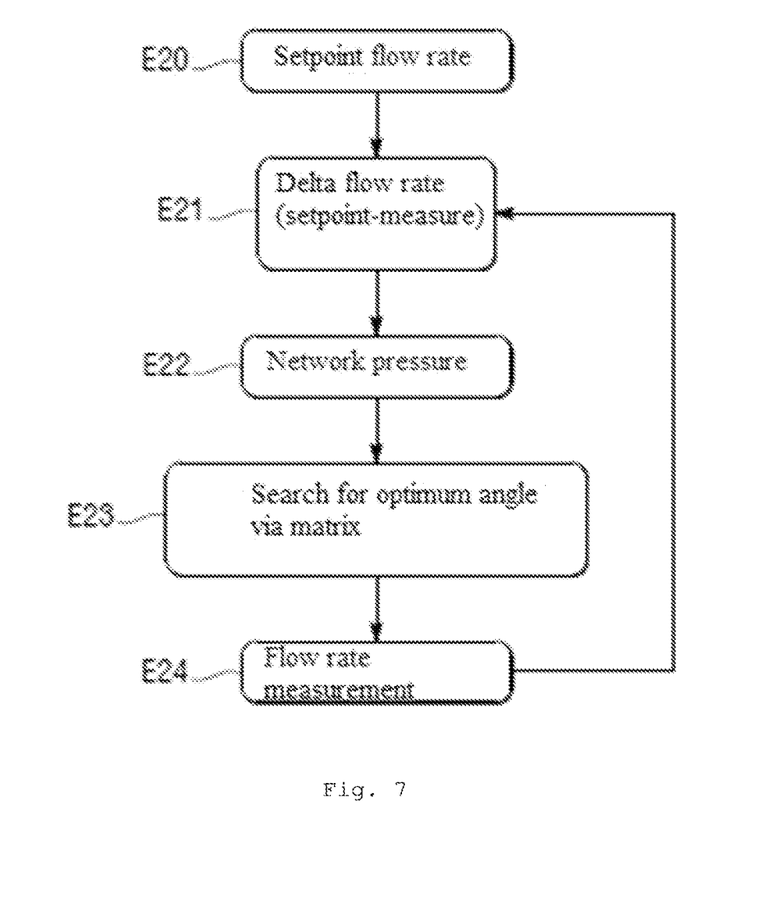
FIG. 7 shows the steps in a regulation method.

To this end, referring now to FIG. 7, the processing circuit 5 acquires a flow rate setpoint (step E20).

The processing circuit 5 then measures the current flow rate using the measurement method which has just been described, then calculates the difference between the flow rate setpoint and the current flow rate (step E21).

The processing circuit 5 then adapts the current position of the ball 14 as a function of this difference.

To this end, the processing circuit 5 acquires the pressure of the network (previously measured via the measurement method)—step E22, then determines, in the third reference table 18, the optimum angular position of the ball 14 which makes it possible to confer on the current flow rate the value for the flow rate setpoint (step E23).

The processing circuit 5 then regulates the valve 12 to bring the ball 14 into the optimum angular position.

The processing circuit 5 then measures the current flow rate again (step E24), and the regulation method goes back to step E21. The servo-control continues until a negligible difference between the current flow rate and the flow rate setpoint is obtained.

Advantageously, if the current position of the ball 14 is such that the current flow rate can be measured by the ultrasonic measurement device 6, the processing circuit 5 can consolidate the measurement of the current flow rate, produced by the ultrasonic measurement device 6, by using the pressure of the water.

As was discussed above, the ultrasonic measuring device 6 uses the ultrasonic signals to calculate the speed of sound in water and the speed of flow of water in the conduit 4. In fact, the difference between the outward and return times for the ultrasonic signals reflects the velocity of the flow. The sum of the outward and return times reflects the temperature of the water.

In order to obtain a very accurate measurement of the flow rate, it is therefore preferable to know the temperature, the speed of sound in the water, and the pressure of the water in the conduit 4.

In general, the pressure is considered to be negligible.

However, the speed of sound in water (as in any fluid) is a function of the temperature and the pressure, inter alia.

Thus, at constant temperature T, the speed c(T, P) of sound in water varies as a function of the pressure P as indicated in the equation of Belogol'skii et al's equation:

$$c(T,P)=c(T,0)+M_1(T)(P-0.101325)+M_2(T)(P-0.101325)^2+M_3(T)(P-0.101325)^3$$

$$c(T,0)=a_{00}+a_{10}T+a_{20}T^2+a_{30}T^3+a_{40}T^4+a_{50}T^5$$

$$M_1(T)=a_{01}+a_{11}T+a_{21}T^2+a_{31}T^3$$

$$M_2(T)=a_{02}+a_{12}T+a_{22}T^2+a_{32}T^3$$

$$M_3(T)=a_{03}+a_{13}T+a_{23}T^2+a_{33}T^3$$

The coefficients $a_{00}$, $a_{10}$, $a_{20}$, etc. are provided in the appendix to the present description.

Figure 8:
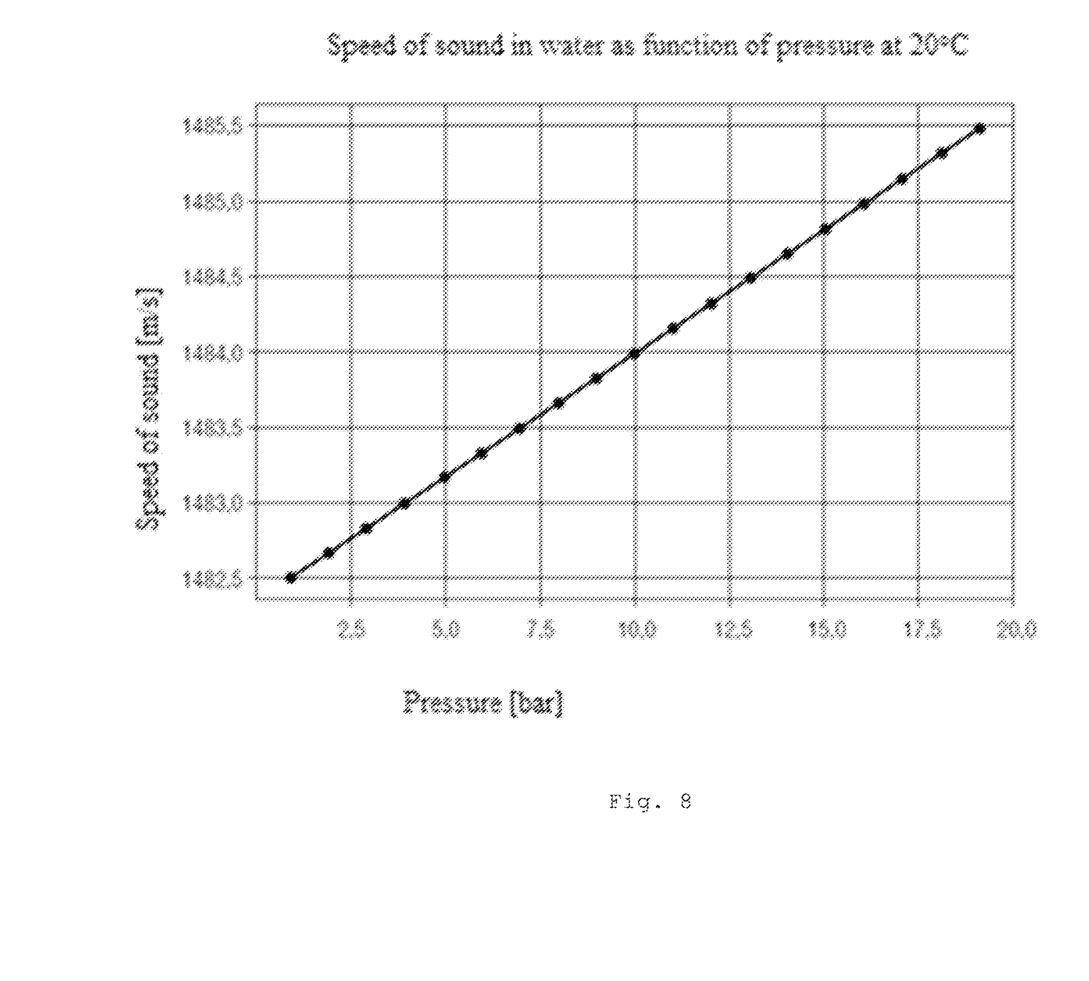
FIG. 8 shows a graph comprising a plot of the speed of sound in water as a function of pressure at 20° C.

It can be seen in FIG. 8 that the speed of sound in water varies as a function of the pressure.

Thus, at 20° C., between a medium at 1 bar and a medium at 16 bar (maximum pressure of a residential water network), the speed of sound will vary from 1482.5 m/s to 1484.99 m/s (difference of 2.48 m/s). This difference corresponds to a temperature difference of 0.82° C.

This difference may introduce an error into the calculation of the flow rate via the second reference table 11 (FIG. 3).

It is therefore advantageous to take the pressure during calibration and during measurement into consideration in order to improve the characterization of the medium and the calculation of the flow rate.

It is then possible to replace the second reference table 11 with a three-dimensional table which comprises a table similar to the table in FIG. 3 for different predefined pressure values.

Advantageously, the processing circuit 5 can use the pressure sensor 16 and the second pressure sensor 17 to evaluate the volume of water dispensed via the conduit 4.

In fact, in the presence of a flow rate, the pressure of the water will vary.

Figure 9:
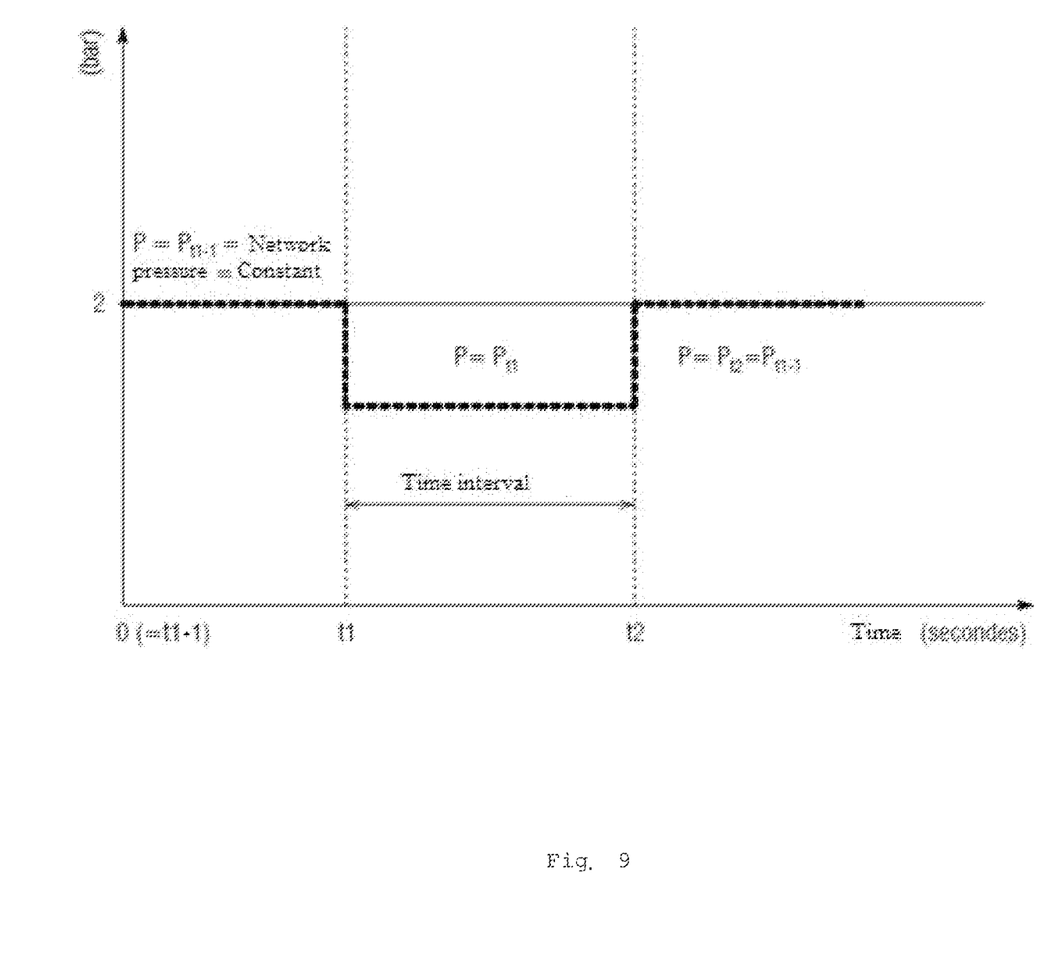
FIG. 9 shows a graph in which the change in the pressure measured in the conduit when the installation starts and then stops consuming water is shown.

To this end, with reference to FIG. 9, the processing circuit 5 detects a time interval which extends between a time t1 and a time t2 such that:
- at time t1, a value of the pressure of the water changes from a value equal to a pressure of the network to another value;
- at time t2, the value of the pressure of the water again becomes equal to the pressure of the network.

At time t1, the water pressure $P_{t1}$ is therefore different from the water pressure $P_{t1-1}$ measured at a time t1-1 preceding time t1: $P_{t1} \neq P_{t1-1}$. The pressure $P_{t1-1}$ is equal to the pressure of the network PS, and the time t1-1 is the time at which the pressure measurement that precedes directly the measurement performed at the time t1 is performed. At time t2, the fluid pressure $P_{t2}$ becomes again equal to the pressure $P_{t1-1}$: $P_{t2}=P_{t1-1}=PS$.

The accuracy of this time interval [t1, t2] depends on the measurement frequency of the pressure sensor 16.

The processing circuit 5 then integrates the current flow rate over the time interval [t1; t2] in order to calculate the volume consumed:

$$\text{Volume}=\int_{t1}^{t2}Q \cdot dt,$$

where Q is the current flow rate (in litres/hour).

It should be noted that the invention may clearly be carried out in a fluid meter other than a water meter. The fluid may in particular be a compressible fluid (for example a gas).

Figure 10:
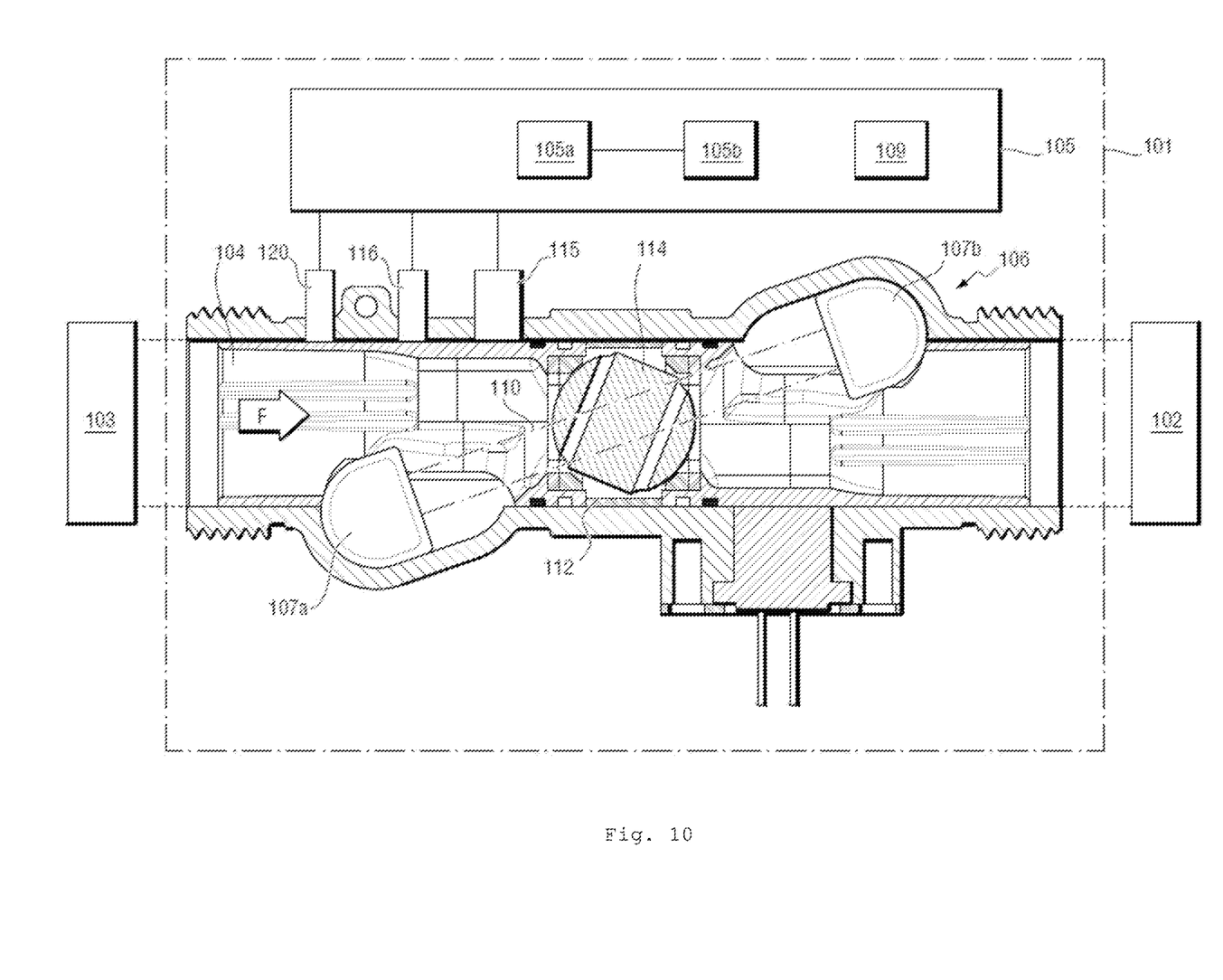
FIG. 10 shows an ultrasonic fluid meter in accordance with a second embodiment of the invention.

In this case, advantageously, with reference to FIG. 10, the ultrasonic fluid meter 101 in accordance with a second embodiment of the invention comprises a temperature sensor 120 for the fluid. Here, the temperature sensor 120 is located upstream of the pressure sensor 116. It should be noted that the references of FIG. 10 are those of FIG. 1 increased by the value 100.

In the case of a compressible fluid, it is in fact impossible to correlate the pressure drop with the flow rate without knowing the temperature.

Specifically, it is known that:

$$P \cdot V = n \cdot R \cdot T,$$

in which:
P: pressure (Pa);
V: volume (m3);
n: quantity of material (mol);
R: ideal gas constant ($\approx 8,314$ J/K/mol);
T: absolute temperature (K).
At a given temperature, we have:

$$Q=K \times \sqrt{\Delta P},$$

in which:
ΔP: pressure drop;
Q: flow rate, in litres per hour.

According to Gay-Lussac's law, at constant volume, the pressure of a certain quantity of gas is directly proportional to its absolute temperature ($P \propto T$):

$$\frac{P1}{T1} = \frac{P2}{T2}$$

Consequently, a variation in pressure may be due to a variation in the flow rate or to a variation in temperature, whence the importance of knowing the absolute temperature in order to be able to correlate the flow rate with the pressure drop. It is therefore necessary to integrate a temperature sensor in the case of gases and to carry out the measurements at constant temperature (if there is only one temperature sensor).

The processing circuit 105 therefore uses a fourth reference table which is in four dimensions. By way of example, this fourth reference table corresponds to the third reference table 18 to which a fourth dimension corresponding to temperature is added.

Naturally, the invention is not limited to the described embodiments, but covers any variant coming within the scope of the invention as defined by the claims.

Clearly, the invention is of application irrespective of the positioning and the configuration of the upstream transducer and the downstream transducer. The ultrasonic signals can be emitted at any angle of orientation with respect to a longitudinal axis of the conduit.

Figure 11:
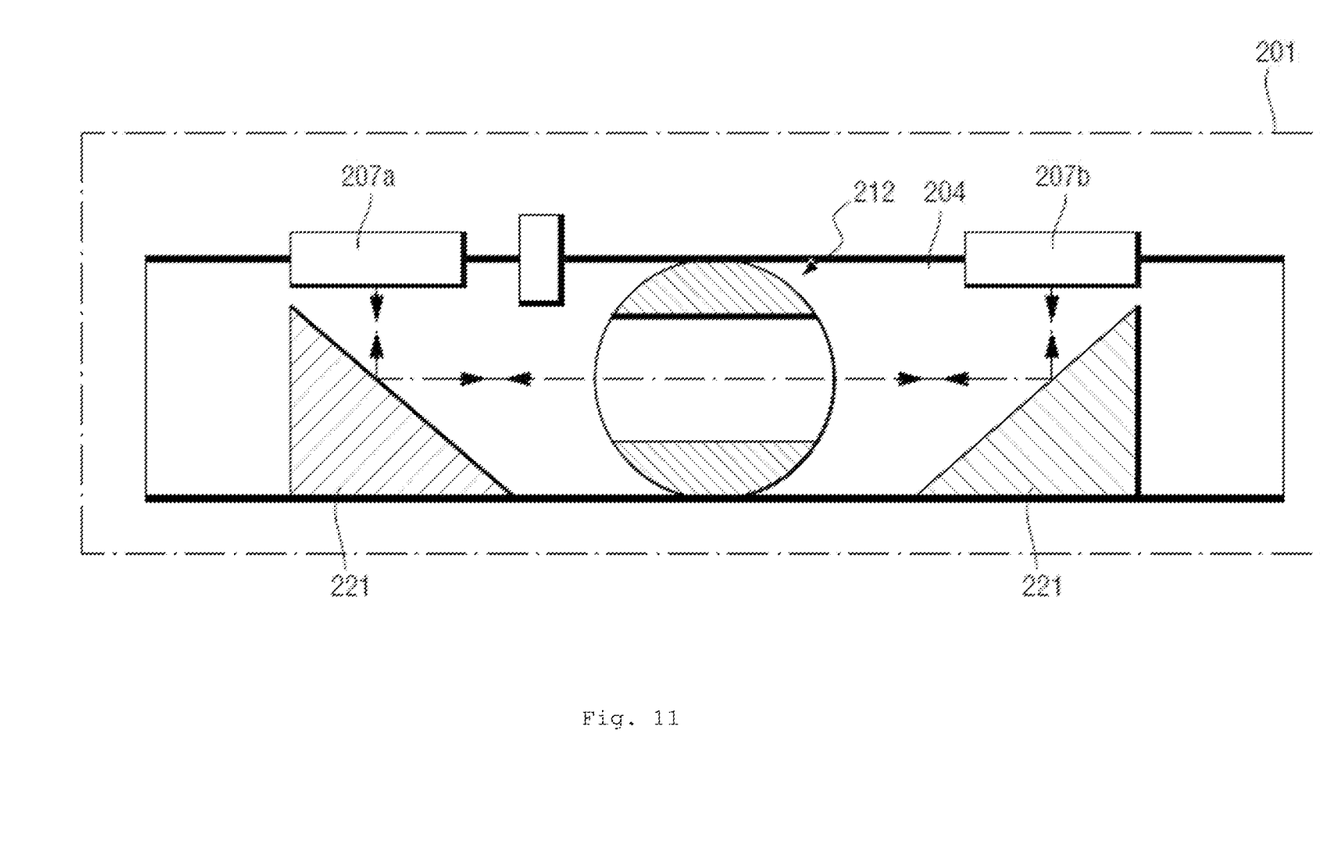
FIG. 11 shows an ultrasonic fluid meter in accordance with a third embodiment of the invention.

The predefined path between the transducers does not necessarily need to be a straight path. FIG. 11 shows an ultrasonic fluid meter 201 in accordance with a third embodiment 201. The ball valve 212 is in the open position. The ultrasonic signals in the conduit 204 emitted and received by the transducers 207a, 207b are reflected by reflectors 221, for example mirrors orientated at 45°.

Clearly, the invention does not apply solely to a water meter, but applies to any meter for any fluid: gas, petroleum, oil, medicine, etc.

The valve does not necessarily need to be a ball valve. Any type of valve may be used to regulate the flow rate, for example a slide valve. The position of the movable member, making it possible to regulate the flow rate, is not necessarily an angular position, but may be an axial position.

The pressure sensor need not necessarily be positioned upstream from the valve, but could be positioned downstream therefrom. However, in this case, the measured pressure, when the valve is completely closed, does not correspond to the pressure of the network.

APPENDIX

The table below contains the coefficients used in Belogol'skii et al's equation.

| | |
|---|---|
| $a_{00}$ | 1402.38744 |
| $a_{10}$ | 5.03836171 |
| $a_{20}$ | $-5.81172916 \times 10^{-2}$ |
| $a_{30}$ | $3.34638117 \times 10^{-4}$ |
| $a_{40}$ | $-1.48259672 \times 10^{-6}$ |
| $a_{50}$ | $3.16585020 \times 10^{-9}$ |
| $a_{01}$ | 1.49043589 |
| $a_{11}$ | $1.077850609 \times 10^{-2}$ |
| $a_{21}$ | $-2.232794656 \times 10^{-4}$ |
| $a_{31}$ | $2.718246452 \times 10^{-6}$ |
| $a_{02}$ | $4.31532833 \times 10-3$ |
| $a_{12}$ | $-2.938590293 \times 10^{-4}$ |
| $a_{22}$ | $6.822485943 \times 10^{-6}$ |
| $a_{32}$ | $-6.674551162 \times 10-8$ |
| $a_{03}$ | $-1.852993525 \times 10^{-5}$ |
| $a_{13}$ | $1.481844713 \times 10^{-6}$ |
| $a_{23}$ | $-3.940994021 \times 10-8$ |
| $a_{33}$ | $3.939902307 \times 10^{-10}$ |

The invention claimed is:

1. An ultrasonic fluid meter comprising:
a conduit in which a fluid can flow;
an ultrasonic measurement device comprising two transducers arranged to emit and receive ultrasonic signals in the conduit, the ultrasonic measurement device being arranged to evaluate a current flow rate of the fluid from the time of flight of the ultrasonic signals between the transducers;
a valve positioned along a length of the conduit between the two transducers, the valve comprising a movable member which extends in the conduit and for which a current position can be regulated in order to control the current flow rate of the fluid;
a position sensor configured to measure the current position of the movable member;
a pressure sensor arranged to measure the pressure of the fluid in the conduit; and
a processing circuit arranged, if the current position of the movable member is such that the current flow rate cannot be measured by the ultrasonic measurement device:
to evaluate the current position of the movable member;
to evaluate the pressure of the fluid at the current flow rate;
to evaluate the pressure of the fluid at zero flow rate; and
to evaluate the current flow rate as a function of the current position of the movable member, the pressure of the fluid at the current flow rate and the pressure of the fluid at zero flow rate.

2. The ultrasonic fluid meter according to claim 1, wherein the pressure sensor is positioned upstream of the valve.

3. The ultrasonic fluid meter according to claim 1, wherein the processing circuit is configured to evaluate the pressure of the fluid at zero flow rate, by:
fully opening the valve;
using the ultrasonic measuring device to measure the current flow rate;
waiting until the current flow rate becomes zero;
then acquiring at least one pressure measurement produced by the pressure sensor.

4. The ultrasonic fluid meter according to claim 2, wherein the processing circuit is configured to evaluate the pressure of the fluid at zero flow rate, by:
fully closing the valve;
then acquiring at least one pressure measurement produced by the pressure sensor.

5. The ultrasonic fluid meter according to claim 1, wherein the processing circuit is arranged, if the current position of the movable member is such that the current flow rate can be measured by the ultrasonic measuring device, to consolidate the measurement of the current flow rate of the fluid, produced by the ultrasonic measuring device, using the pressure of the fluid.

6. The ultrasonic fluid meter according to claim 1, the fluid being a compressible fluid, the meter further comprising a temperature sensor configured to measure a temperature of the fluid in the conduit, the processing circuit being configured such that, if the current position of the movable member is such that the current flow rate cannot be measured by the ultrasonic measuring device, it also uses the temperature of the fluid to evaluate the current flow rate.

7. The ultrasonic fluid meter according to claim 1, wherein the valve is a ball valve.

8. A method for measuring a current flow rate of a fluid, carried out in the processing circuit of an ultrasonic fluid meter according to claim 1 and, if the current position of the movable member is such that the current flow rate cannot be measured by the ultrasonic measuring device, comprising the step of evaluating the current flow rate as a function of the current position of the movable member, of the pressure of the fluid to the current flow rate, and of the pressure of the fluid at zero flow rate.

9. The measurement method according to claim 8, wherein, if the current position of the movable member is such that the current flow rate can be measured by the ultrasonic measuring device, it comprises the steps of
measuring the current position of the mobile member;
fully opening the valve;
using the ultrasonic measuring device to measure the current flow rate;
waiting until the current flow rate becomes zero;
acquiring at least one pressure measurement produced by the pressure sensor, and thus evaluating the pressure of the fluid at zero flow rate;
returning the movable member to said current position;

then acquiring at least one pressure measurement produced by the pressure sensor, and thus evaluating the pressure of the fluid at the current flow rate;

estimating the current flow rate as a function of said current position of the moving member, of the pressure of the fluid at the current flow rate, and of the pressure of the fluid at zero flow rate.

10. The measurement method according to claim 8, further comprising the steps of:

detecting a time interval which extends between a time t1 and a time t2 such that:
   at time t1, a value of the pressure of the fluid changes from a value equal to a pressure of the network to another value;
   at time t2, the value of the pressure of the fluid again becomes equal to the pressure of the network;

integrating the current flow rate over the time interval [t1; t2] in order to calculate the volume consumed.

11. A non-transitory, computer readable storage medium storing a computer program comprising instructions which cause the processing circuit of the meter to execute the steps of the measurement method as claimed in claim 8.

12. A method for regulating a current flow rate of a fluid, which is carried out in a processing circuit of an ultrasonic fluid meter and comprising the steps of:

acquiring a flow rate setpoint;
estimating the current flow rate using the measurement method according to claim 8;
adapting the current position of the movable member as a function of a difference between the flow rate setpoint and the current flow rate.

13. A non-transitory, computer readable storage media which can be read by a computer, on which a computer program comprising instructions which cause the processing circuit of the meter to execute the steps of the regulation method according to claim 12 is stored.

* * * * *